United States Patent
Kardos et al.

(10) Patent No.: US 8,251,023 B2
(45) Date of Patent: Aug. 28, 2012

(54) COOLING ARRANGEMENT AT A VEHICLE

(75) Inventors: Zoltan Kardos, Södertälje (SE); Hans Wikström, Johanneshov (SE); Erik Söderberg, Stockholm (SE)

(73) Assignee: Scania CV AB (SE)

( * ) Notice: Subject to any disclaimer, the term of this patent is extended or adjusted under 35 U.S.C. 154(b) by 670 days.

(21) Appl. No.: 12/441,744

(22) PCT Filed: Sep. 11, 2007

(86) PCT No.: PCT/SE2007/050645
§ 371 (c)(1),
(2), (4) Date: Mar. 18, 2009

(87) PCT Pub. No.: WO2008/041925
PCT Pub. Date: Apr. 10, 2008

(65) Prior Publication Data
US 2010/0006043 A1    Jan. 14, 2010

(30) Foreign Application Priority Data
Oct. 3, 2006   (SE) .................................. 0602069-7

(51) Int. Cl.
*F01P 1/06*   (2006.01)
(52) U.S. Cl. .................................. 123/41.31; 123/41.01
(58) Field of Classification Search .............. 123/41.01, 123/542, 568.12, 41.49, 41.51, 41.29, 41.31; 60/599
See application file for complete search history.

(56) References Cited

U.S. PATENT DOCUMENTS

| | | | |
|---|---|---|---|
| 3,752,132 A * | 8/1973 | Bentz et al. ................... | 123/563 |
| 4,062,188 A * | 12/1977 | Cutler et al. ................... | 60/599 |
| 4,236,492 A * | 12/1980 | Tholen ........................... | 123/563 |
| 5,234,051 A | 8/1993 | Weizenburger et al. | |
| 5,373,892 A | 12/1994 | Johnson et al. | |
| 6,098,576 A * | 8/2000 | Nowak et al. ............... | 123/41.33 |
| 6,321,694 B1 * | 11/2001 | Vergine et al. ............ | 123/27 GE |
| 6,321,697 B1 * | 11/2001 | Matsuda et al. ........... | 123/41.29 |
| 2005/0252635 A1 | 11/2005 | Adamson et al. | |
| 2006/0048922 A1 * | 3/2006 | Ambros et al. ............... | 165/140 |
| 2006/0185626 A1 * | 8/2006 | Allen et al. ................. | 123/41.12 |

FOREIGN PATENT DOCUMENTS

| | | | |
|---|---|---|---|
| FR | 2726325 A1 | 5/1996 | |
| GB | 2326626 A | 12/1998 | |

OTHER PUBLICATIONS

International Search Report dated Jan. 17, 2008, issued in corresponding international application No. PCT/SE2007/050645.

* cited by examiner

*Primary Examiner* — Nathaniel Wiehe
*Assistant Examiner* — Long T Tran
(74) *Attorney, Agent, or Firm* — Ostrolenk Faber LLP

(57) ABSTRACT

A cooling arrangement for a vehicle which is powered by a combustion engine. The cooling arrangement includes an air passage through which air flows in a specific direction, and at least three cooling elements to effect cooling of a medium. The three cooling elements are arranged one after another in the air passage such that at least part of the air which flows through the air passage flows successively through all of the cooling elements and cools the media in the respective cooling elements. The cooling elements are arranged one after another in the air passage in a sequence which is related to the temperature of the media in the respective cooling elements such that the air which flows through the cooling elements in the air passage cools a succession of media, each media in succession is at a higher temperature than the one preceding it.

6 Claims, 1 Drawing Sheet

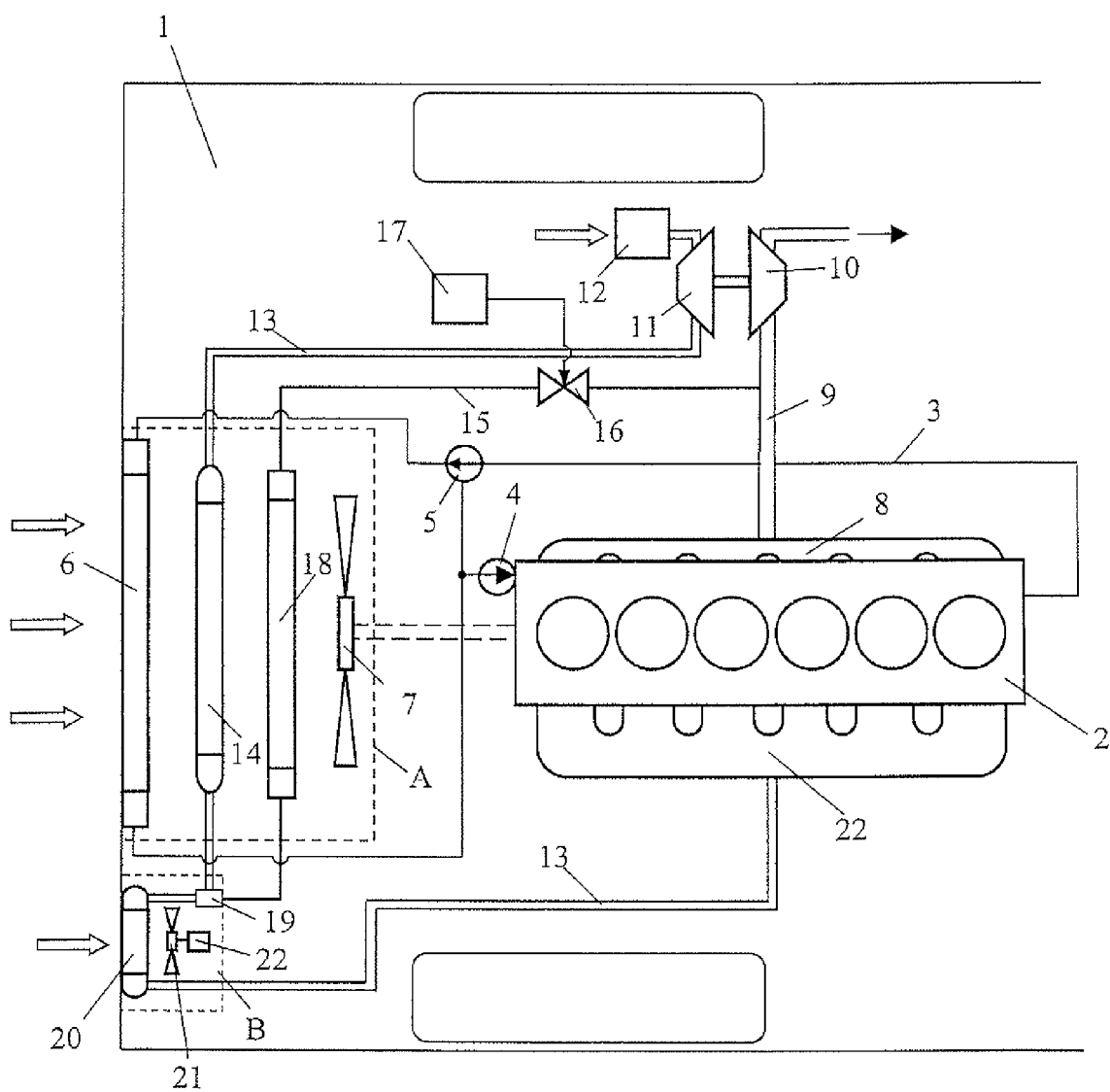

COOLING ARRANGEMENT AT A VEHICLE

CROSS REFERENCE TO RELATED APPLICATION

The present application is a 35 U.S.C. §§371 national phase conversion of PCT/SE2007/050645, filed Sep. 11, 2007, which claims priority of Swedish Application No. 0602069-7, filed Oct. 3, 2006, the disclosure of which is incorporated by reference herein. The PCT International Application was published in the English language.

BACKGROUND TO THE INVENTION, AND STATE OF THE ART

The present invention relates to a cooling arrangement of a vehicle for cooling several media in sequence.

Particularly in heavy vehicles there is an increasing need for various forms of cooling. The coolant of the cooling system which cools the combustion engine is increasingly being used to cool also other components of the vehicle, e.g. retarders. Supercharged combustion engines with ever higher charging are being used increasingly to power heavy vehicles for environmental reasons and in response to demands for higher performance. The compressed air needs effective cooling in a charge air cooler before it is led to the combustion engine. For environmental reasons, there is also increasing use of the technique called EGR (Exhaust Gas Recirculation) whereby part of the exhaust gases from a combustion engine is recirculated and mixed with the inlet air to the combustion engine. Adding exhaust gases to the inlet air leads to a lower combustion temperature resulting inter alia in the exhaust gases having a reduced content of nitrogen oxides $NO_x$. The recirculating exhaust gases are cooled in at least one EGR cooler before they are mixed with the air and led to the combustion engine.

Vehicles usually comprise at a front portion an air passage with a radiator fan which provides a forced flow of air through the passage. A radiator for cooling the coolant which cools the combustion engine is usually arranged in such an air passage. In vehicles powered by a supercharged combustion engine, an air-cooled charge air cooler is usually also situated in such an air passage at a position in front of the radiator with the coolant. Such positioning of the charge air cooler makes it possible to cool the charge air to a temperature substantially corresponding to the temperature of the surrounding air. A disadvantage of such positioning is that the coolant undergoes less cooling in the radiator situated to the rear, since it is cooled by air which has already been used for cooling the charge air. However, space in a vehicle is very limited, so it is often necessary to use the existing flow of air in the air passage to cool two or more media in a plurality of cooling elements situated one after another. Any air-cooled EGR cooler used for cooling the recirculating exhaust gases may also be situated in the existing air passage.

SUMMARY OF THE INVENTION

The object of the present invention is to provide a cooling arrangement which has at least three cooling elements for cooling of different media in an air passage so that optimum use can be made of a cooling flow of air through the air passage to cool the media in the cooling elements.

This object is achieved with the cooling arrangement. A cooling arrangement for a vehicle which is powered by a combustion engine. The cooling arrangement includes an air passage through which air flows in a specific direction, and at least three cooling elements to effect cooling of a medium. The three cooling elements are arranged one after another in the air passage such that at least part of the air which flows through the air passage flows successively through all of the cooling elements and cools the media in the respective cooling elements. The cooling elements are arranged one after another in the air passage in a sequence which is related to the temperature of the media in the respective cooling elements such that the air which flows through the cooling elements in the air passage cools a succession of media, each media in succession is at a higher temperature than the one preceding it. The cooling effect provided by cooling air flow through a number of the cooling elements in an air passage is related to the product arrived at by multiplying the mass flow of the air which flows through the cooling elements by the temperature increase which the cooling air undergoes by passing through the cooling elements. For the available airflow through the air passage to be usable in an optimum manner for cooling the media in the cooling elements, the air needs to maintain a large temperature difference relative to each of the media in the respective cooling elements. For such to be the case, the sequence in which the air flows through the cooling elements needs to be such that each medium being cooled in sequence is at a higher temperature than the one preceding it. The existing cooling airflow is thus used in such a way that the media are provided with optimum aggregate cooling. Arranging the cooling elements in such a sequence in the air passage enables not only optimum aggregate cooling but also relatively uniform cooling of the respective media by the cooling airflow.

According to a preferred embodiment of the present invention, one of said cooling elements is a radiator with a medium in the form of a radiator liquid intended to cool the combustion engine. Such a radiator is normally situated in an air passage at a front portion of the vehicle. During operation of the combustion engine, the radiator liquid is at a temperature of about 100° C. when it reaches the radiator. One of said cooling elements may be a charge air cooler with a medium in the form of compressed air intended to be led to the combustion engine. The charge air may be at a temperature of up to 200° C. after it has been compressed in a turbo unit of the vehicle. Air-cooled charge air coolers are often situated at the front portion of the vehicle in the same air passage as the radiator with the coolant. One of said cooling elements may be an EGR cooler with a medium in the form of exhaust gases which are intended to be recirculated to the combustion engine. The exhaust gases leaving the combustion engine may be at a temperature of up to 700° C. If the aforesaid three cooling elements are arranged in an air passage, the radiator for the coolant has to be fitted furthest forward in the air passage, since the coolant is the medium which is at the lowest temperature. The charge air cooler is arranged behind the radiator for the coolant, since the charge air has the next lowest temperature of the media which are to be cooled by the airflow in the air passage. The EGR cooler is arranged furthest back in the air passage, since the exhaust gases have the highest temperature of the media which are intended to be cooled in the air passage. Thus the cooling elements are arranged in a sequence with a successive rise in temperature of the media in the airflow direction. The result is optimum aggregate cooling of the media. Media other than those indicated above may of course be cooled in a cooling element situated in the air passage together with other cooling elements. Such a medium may be the cooling medium used in an air conditioning system of the vehicle.

According to another embodiment of the invention, the cooling arrangement is a radiator fan adapted to providing a forced flow of air through the air passage. A larger airflow and a greater cooling effect can thus be provided than if the airflow through the passage is entirely generated by the movement of the vehicle. With advantage, the radiator fan is driven by the combustion engine. Accordingly the magnitude of the resulting forced airflow through the air passage is related to the speed of the combustion engine.

According to another preferred embodiment of the invention, the cooling arrangement comprises an extra air passage adapted to having air flowing through it, and at least one extra cooling element arranged in the extra air passage and adapted to providing a further step of cooling for at least one of the aforesaid media which have already undergone cooling in the first air passage. For optimum engine performance, the charge air and the recirculating exhaust gases need to be cooled to a low temperature substantially corresponding to the temperature of the surroundings. Since the charge air cooler and the EGR cooler are situated downstream of the radiator for the coolant, they cannot be cooled to the temperature of the surroundings by the air in the first air passage. Such an extra air passage makes it possible for the charge air and/or the recirculating exhaust gases to undergo a further step of cooling by air which is at the temperature of the surroundings. Since the air in the first air passage has been used in such a way as to provide optimum aggregate cooling of the media, the extra cooling element in the extra air passage may in many cases be quite small.

According to a preferred embodiment of the invention, the extra cooling element is adapted to effecting cooling of a mixture of compressed air from the charge air cooler and returned exhaust gases from the EGR cooler. The cooled air from the charge air cooler and the cooled exhaust gases from the EGR cooler can here be mixed, followed by the mixture being led to the extra cooling element in which it undergoes a further step of cooling by the air at the temperature of the surroundings which flows through the extra air passage. With advantage, the cooling arrangement comprises a second radiator fan adapted to providing a forced airflow through the extra air passage. The second radiator fan may be driven by an electric motor. Airflow through the extra air passage which is independent of the speed of the combustion engine is thus provided.

BRIEF DESCRIPTION OF THE DRAWINGS

A preferred embodiment of the invention is described below by way of example with reference to the attached drawing, in which:

FIG. 1 depicts a cooling arrangement of a vehicle according to an embodiment of the present invention.

DETAILED DESCRIPTION OF A PREFERRED EMBODIMENT OF THE INVENTION

FIG. 1 depicts schematically a vehicle 1 powered by a supercharged combustion engine 2. The vehicle 1 may be a heavy vehicle powered by a supercharged diesel engine. The combustion engine 2 is cooled in a conventional manner by a cooling system containing a coolant which circulates in a coolant line 3. The coolant is circulated in the cooling system by a coolant pump 4. The cooling system also comprises a thermostat 5. The coolant of the cooling system is intended to be cooled in a radiator 6 arranged at a forward portion of the vehicle 1 in an air passage A. The coolant is cooled in the radiator 6 by the air which is caused to flow through the air passage A in a specific direction by a radiator fan 7. The radiator fan 7 is driven by the combustion engine 2 via a suitable connection.

The exhaust gases from the cylinders of the combustion engine 2 are led via an exhaust manifold 8 to an exhaust line 9. The exhaust gases in the exhaust line 9, which are at above atmospheric pressure, are led to a turbine 10 of a turbo unit. The turbine 10 provides a driving force which is transferred, via a connection, to a compressor 11. The compressor 11 compresses the air which is led via an air filter 12 into an inlet line 13. A charge air cooler 14 is situated in the inlet line 13. The charge air cooler 14 is situated in the air passage A at a location downstream of the radiator 6 with respect to the direction of air flow through the air passage A. The function of the charge air cooler 14 is to cool the compressed air before it is led to the combustion engine 2.

The combustion engine 2 is provided with an EGR (Exhaust Gas Recirculation) system for recirculation of exhaust gases. Adding exhaust gases to the compressed air which is led to the combustion engine 2 lowers the combustion temperature and hence also the content of nitrogen oxides ($NO_x$) formed during the combustion processes. A return line 15 for recirculation of exhaust gases extends from the exhaust line 9 to the inlet line 13. The return line 15 comprises an EGR valve 16 by means of which the exhaust flow in the return line 15 can be shut off. The EGR valve 16 may also be used for steplessly controlling the amount of exhaust gases which is led from the exhaust line 9 to the inlet line 13 via the return line 15. A control unit 17 is adapted to using information about, for example, the load of the combustion engine 2 to control the EGR valve 16 so that a desired amount of exhaust gases is returned via the return line 15. The return line 15 comprises an EGR cooler 18 for cooling the exhaust gases. The EGR cooler 18 is situated in the air passage A at a location downstream of the radiator 6 and the charge air cooler 14.

In supercharged diesel engines 2, in certain operating situations, the pressure of the exhaust gases in the exhaust line 9 is lower than the pressure of the compressed air in the inlet line 13. In such situations it is not possible to mix the exhaust gases in the return line 15 directly with the compressed air in the inlet line 13 without special auxiliary means. A venturi 19 may for example be used for the purpose. If instead the combustion engine 2 is a supercharged Otto engine, the exhaust gases in the return line 15 can be led directly into the inlet line 13, since the exhaust gases in the exhaust line 9 of an Otto engine in substantially all operating situations are at a higher pressure than the compressed air in the inlet line 13. When the exhaust gases have mixed with the compressed air in the inlet line 13, the mixture is led to an extra cooler 20 in which the mixture of exhaust gases and air undergoes a second step of cooling. The extra cooler 20 is situated in an extra air passage B. The mixture of exhaust gases and air is cooled in the extra cooler 20 by the air which is caused to flow through the passage B in a specific direction by a radiator fan 21. The radiator fan 21 is driven here by an electric motor 22. The cooled mixture of exhaust gases and air is thereafter led via a manifold 22 to the respective cylinders of the combustion engine 2.

During operation of the combustion engine 2, warm coolant is led via the line 3 from the combustion engine 2 to the radiator 6 in order to be cooled by the air which flows through the air passage A. The coolant may here be at a temperature of up to about 100° C. The temperature of the air initially flowing through the air passage A substantially corresponds to the temperature of the surroundings. The result is a relatively large temperature difference between the cooling air flowing through the radiator 6 and the coolant in the radiator 6. The coolant is thus provided with very good cooling in the radiator 6. Compressed warm air is led from the compressor 11 via the line 13 to the charge air cooler 14. The compressed air may here be at a temperature of up to about 200° C. Although the air flowing through the air passage A is at a higher temperature after it has cooled the coolant in the radiator 6, there is still a relatively large temperature difference between the air flowing through the charge air cooler 14 and the compressed air in the charge air cooler 14. The result is good cooling of the charge air in the charge air cooler 14. Exhaust gases are led from the exhaust line 9 via the return line 15 to the EGR cooler 18. The exhaust gases may be at a temperature of up to about 700° C. Although the air flowing through the air passage A progressively acquires a higher temperature by cooling the coolant in the radiator 6 and the compressed air in the charge air cooler 14, its temperature is still significantly lower than that of the exhaust gases in the EGR cooler 18. Thus the recirculating exhaust gases can also be subjected to good cooling in the EGR cooler 18.

The total cooling effect which the air flow through the air passage A provides is related to the total temperature rise ΔT which the air undergoes as it flows through the radiator 6, the charge air cooler 14 and the EGR cooler 18. The total temperature rise ΔT is the aggregate of the temperature rises of the air due to its passing through, and cooling the respective media in, the radiator 6, the charge air cooler 14 and the EGR cooler 18. The aforesaid cooling elements 6, 14, 18 are here arranged one after another in the air passage A in a sequence which is related to the temperature of the media in the respective cooling elements 6, 14, 18 in such a way that the air flowing through the cooling elements 6, 14, 18 cools a succession of media, each of which is at a higher temperature than the one preceding it. With such a cooling arrangement of the cooling elements 6, 14, 18, the cooling airflow can provide optimum aggregate cooling of media in the respective cooling elements 6, 14, 18. The air thus undergoes a corresponding maximum temperature rise ΔT by passing through the cooling elements 6, 14, 18. Such a cooling arrangement of the cooling elements 6, 14, 18 also makes possible a relatively uniform cooling of the media in the respective cooling elements 6, 14, 18. The existing cooling airflow can thus be put to optimum use for cooling the media in the respective cooling elements 6, 14, 18. With the aforesaid cooling arrangement, the compressed air in the charge air cooler 14 and the exhaust gases in the EGR cooler 18 are cooled by air which is at a higher temperature than the surroundings. There is therefore no risk of water vapour in the compressed air and in the exhaust gases precipitating and freezing to ice within the charge air cooler 14 and the EGR cooler 18 respectively, which might be the case when using surrounding air at a lower temperature than 0° C.

It is often desired, however, to cool the charge air and the exhaust gases to a temperature substantially corresponding to the temperature of the surroundings when the latter is over 0° C. To make this possible, the cooled charge air from the charge air cooler 14 and the exhaust gases from the EGR cooler 18 are mixed at ref. 19, after which they are jointly led to the extra cooling element 20 situated in the extra air passage B. The radiator fan 21 here forces air at the temperature of the surroundings through the extra cooling element 20 so that the mixture of air and exhaust gases assumes a temperature substantially corresponding to the temperature of the surroundings before it is led to the combustion engine 2. In situations where the temperature of the surroundings is below 0° C., the cooling of the compressed air and the exhaust gases in the air passage A may be quite sufficient. To prevent further cooling of the compressed air and the exhaust gases in the cooling element 20, the radiator fan 21 may be switched off when the temperature of the surroundings falls below a specific value, in order to prevent ice forming in the cooling element 20. Alternatively, the cooling arrangement might comprise a bypass line leading the mixture of compressed air and exhaust gases past the extra cooling element 20 when the temperature of the surrounding air is too low.

The invention is in no way limited to the embodiments to which the drawing refers but may be varied freely within the scopes of the claims. Media other than those exemplified above may of course be cooled in a cooling element in the air passage A. The extra cooling element 20 may be used to cool only one medium which has already undergone a first step of cooling in the first air passage A.

The invention claimed is:

1. A cooling arrangement for a vehicle powered by a combustion engine, the cooling arrangement comprising:
    an air passage configured and operable to receive air flow in a first direction;
    at least three cooling elements, each cooling element positioned in the air passage and configured and operable to effect cooling of a respective medium passing through the respective cooling element, the cooling elements are arranged one after another in the air passage along the first direction such that at least part of the air flowing through the air passage flows as a coolant successively past all of the cooling elements;
    a respective connection for each medium from the engine to a respective one of the cooling elements;
    the first cooling element positioned first upstream in the air passage along the first direction comprises a radiator configured and operable to cool a first medium in the form of a radiator liquid for cooling the combustion engine, the second cooling element downstream in sequence along the first direction comprises a charge air cooler configured and operable to cool a second medium in the form of compressed air which is led to the combustion engine, and the third cooling element downstream in sequence along the first direction comprises an EGR cooler configured and operable to cool a third medium in the form of exhaust gases which are recirculated to the combustion engine;
    a second air passage positioned, configured and operable to receive air flow; and
    at least one extra cooling element arranged in the second air passage and positioned and configured to again cool at least one of the media which had already been cooled in the air passage before the at least one of the media is fed to the engine.

2. A cooling arrangement according claim 1, further comprising a radiator fan positioned and operable to provide a forced flow of air through the air passage in the first direction.

3. A cooling arrangement according to claim 2, wherein the radiator fan is configured to be driven by the combustion engine.

4. A cooling arrangement according to claim 1, further comprising:
    a mix connection positioned and configured to mix compressed air from the charge air cooler and returned exhaust gases from the EGR cooler; and
    the extra cooling element is positioned, configured and operable to cool a mixture of compressed air from the charge air cooler and returned exhaust gases from the EGR cooler mixed at the mix connection.

5. A cooling arrangement according to claim 1 further comprising a second radiator fan positioned and operable to provide a forced flow of air through the second air passage.

6. A cooling arrangement for a vehicle powered by a combustion engine, the cooling arrangement comprising:
- an air passage positioned and configured to receive air flow in a first direction;
- a first cooling element, a second cooling element and a third cooling element, each cooling element positioned in the air passage and configured to cool a medium passing through the respective cooling element, the cooling elements are arranged one after another in the air passage along the first direction such that at least part of the air flowing through the air passage flows as a coolant successively past each of the cooling elements;
- the first cooling element positioned first upstream in the air passage along the first direction comprises a radiator configured to cool a first medium, the first medium being a radiator liquid for cooling the combustion engine, the second cooling element positioned downstream in sequence along the first direction comprises a charge air cooler configured to cool a second medium, the second medium being compressed air led to the combustion engine, and the third cooling element positioned downstream in sequence along the first direction comprises an EGR cooler configured to cool a third medium, the third medium being exhaust gases recirculated to the combustion engine,
- wherein an entirety of the second cooling element and an entirety of the third cooling element are positioned behind the first cooling element in the first direction.

* * * * *